Nov. 15, 1938.  M. MASSONI  2,136,857
WINDMILL
Filed Sept. 25, 1936  3 Sheets-Sheet 1

INVENTOR.
M. Massoni
BY
Glascock Downing Seebold
ATTORNEYS.

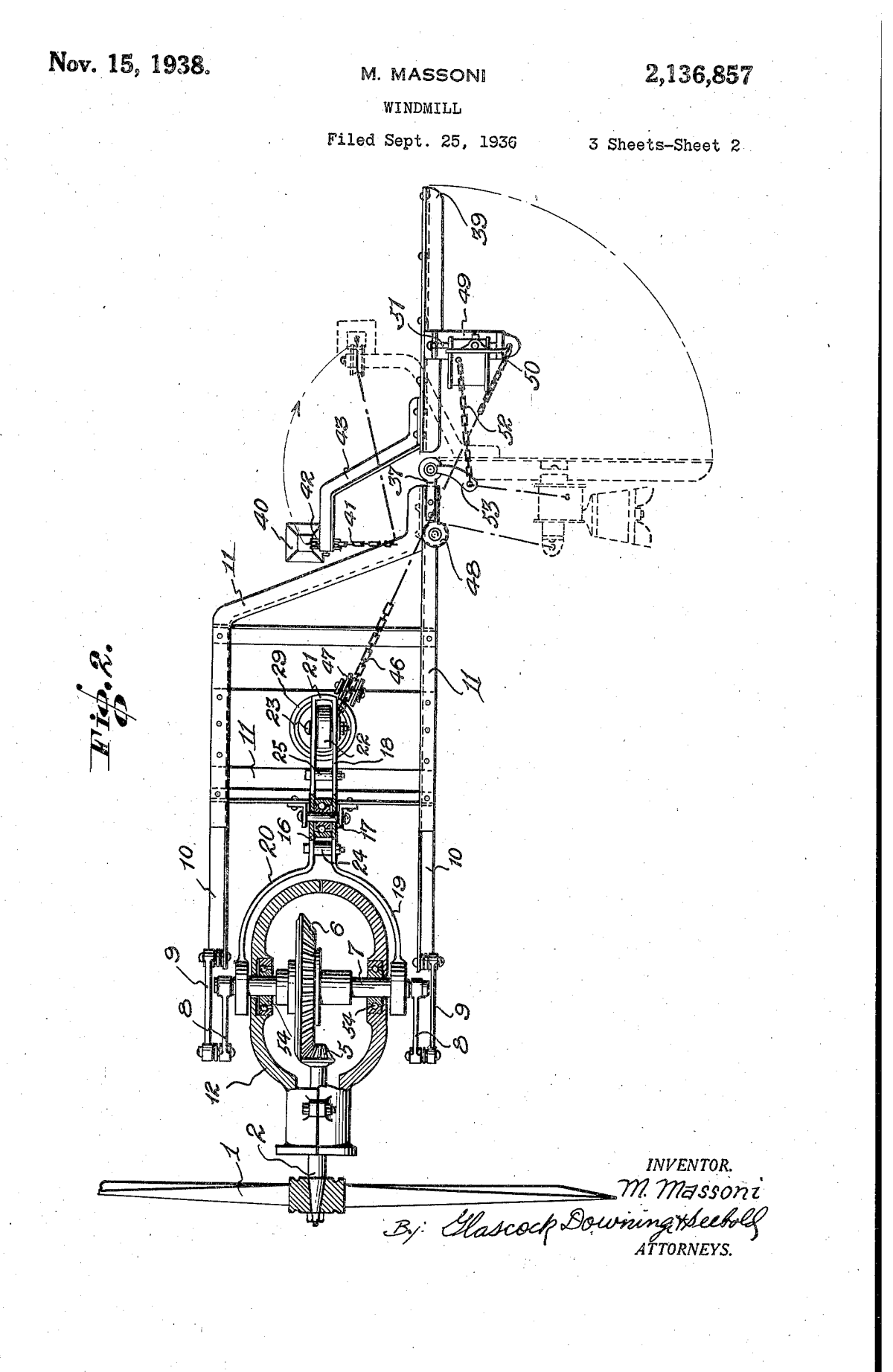

Nov. 15, 1938.   M. MASSONI   2,136,857
WINDMILL
Filed Sept. 25, 1936   3 Sheets-Sheet 2

Fig. 2.

INVENTOR.
M. Massoni
By: Glascock Downing & Seebold
ATTORNEYS.

Nov. 15, 1938.　　　　　M. MASSONI　　　　　2,136,857
WINDMILL
Filed Sept. 25, 1936　　　3 Sheets—Sheet 3
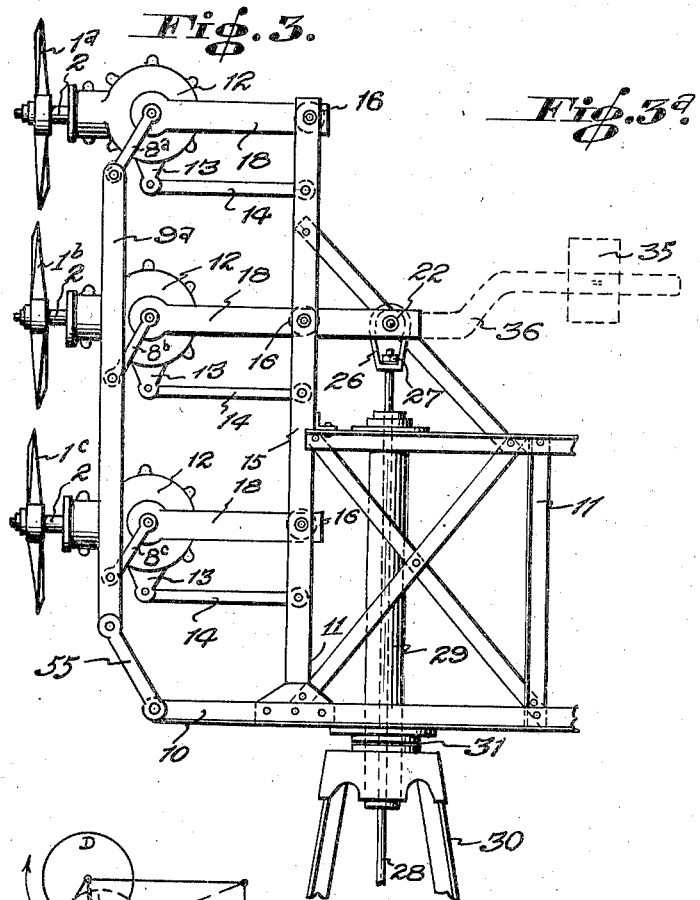
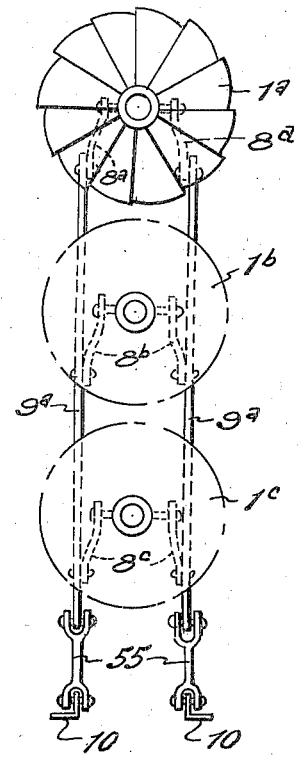
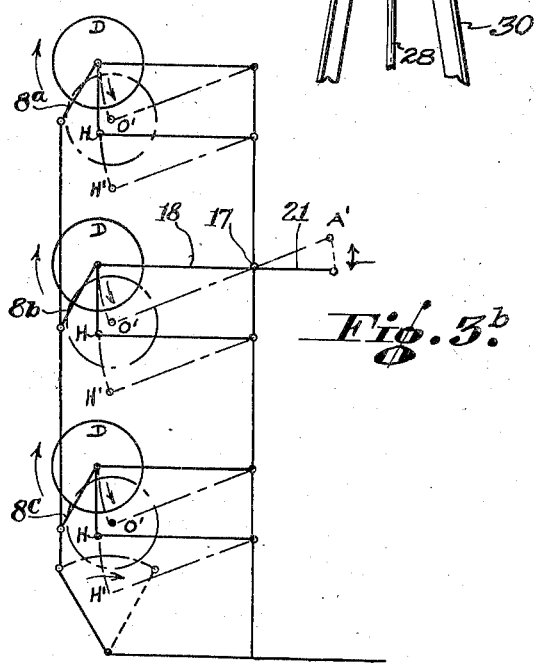
INVENTOR.
M. Massoni
BY
Glascock Downing & Seebold
ATTORNEYS.

Patented Nov. 15, 1938

2,136,857

UNITED STATES PATENT OFFICE 2,136,857

WINDMILL

Miguel Massoni, Cordoba, Argentina

Application September 25, 1936, Serial No. 102,625
In Argentina April 16, 1936

2 Claims. (Cl. 170—42)

This invention relates to improvements in wind-mills of the type employing one or more wind-driven wheels to utilize the kinetic force of the wind.

One characteristic of this invention resides in that the wheel is provided with a shaft that is introduced in a box having gears whence a ring gear moves a shaft projecting from both ends of said box with a rotation rhythm proportionally less than the shaft of the wheel. The shaft of the gear box is provided with two arms moving as many rods in the other ends of which there are established bearing surfaces only. Complementary with said arms and on the same points of said shaft are arranged two bearings mounted on the points of a balancing fork which is a lever of first order. The power is exercised on the arms by the shaft of the gear box, the bearing point is the centre and the branch of the fork is connected to the rod of the pump.

An accessory characteristic of this invention resides in the fact that the box carries at its lower portion a flange limiting the movement of inclination of the wheel.

Another characteristic consists in that the lever can be compensated by a counterweight.

Other characteristics will be seen in the accompanying drawings wherein the apparatus is shown in detail.

In Fig. 1a the working diagram of the motor is shown.

Fig. 2 shows the device as seen from above; in this figure the details of the rudder or tail of the apparatus are illustrated.

Fig. 3 is a side view showing a modification of the motor shown in Fig. 1.

Fig. 3a is a front view of Fig. 3, and finally, Fig. 3b illustrates the working diagram of Figs. 3 and 3a.

Figure 1:
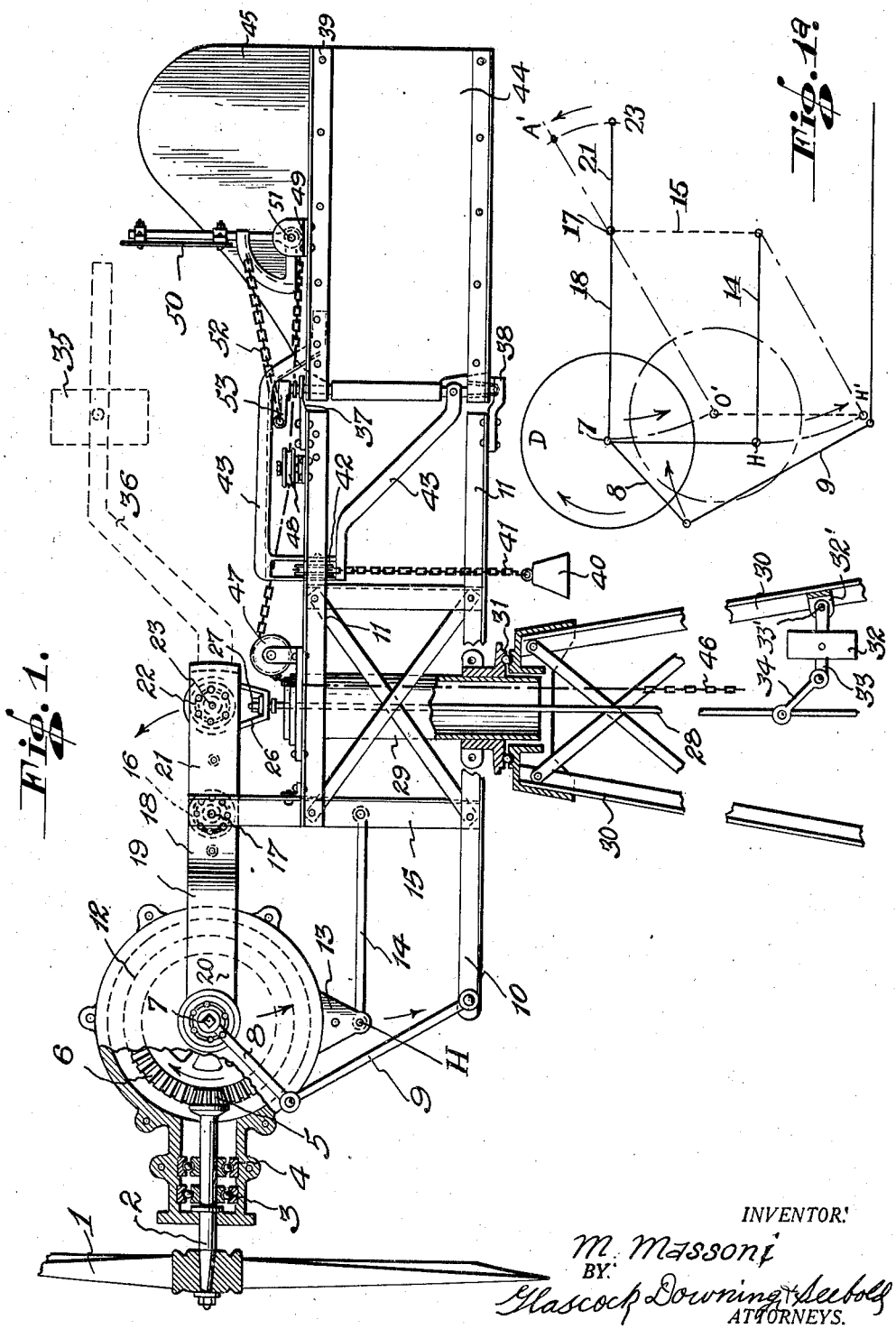
Fig. 1 is a side view of the wind-motor partially in section so as to disclose certain details.

The wheel 1 provided with blades is mounted on and fixed to the shaft 2 which is supported by the bearings 3 and 4 within which it rotates. At its other end this shaft 2 carries a conical gearing 5 which meshes with rim 6. This rim 6 is mounted on and secured to a shaft 7 which carries at both ends a lever arm 8 and turns in two bearings 54. Both arms 8 carry in continuation a rod 9 which is secured at its other end to an angle iron 10 which, in turn, is fixed to the body frame 11 of the device.

The pinion 5 and the rim 6 turn freely inside the grease box 12 provided with a projection 13 to which there is fixed and pivoted an arm 14 the other end of which is attached to the frame members 15 that is an integral part of the frame 11.

On the member 15, that is to say, on its upper end, a bearing 16 rests, that turns on the shaft 17. A bifurcated arm 18 is associated with the bearing 16 and provided with two branches 19 and 20 which are fixed to the shaft 7. The other end 21 of the arm 18 carries between both branches a wheel 22 fixed by the shaft 23 which passes through the branches of the arm 18. These branches carry two separators 24 and 25.

To the wheel 22 there is fixed a bracket 26 to which is coupled a rod 28. The rod is rotatably connected to the bracket 26 by means of the nut 27. The rod 28 passes through the tube 29 that serves as a rotating shaft between the frame 11 and the tower 30. To facilitate this rotation the frame 11 rests on the tower 30 by means of a ball-table 31.

At the lower portion of the tower 30 is arranged a weight 32 movable over the arm 33 which, in turn, is pivoted to a rod 34 which is secured to the rod 28. The other end of the arm 33 is hinged to a lug 32' by means of a pin 33'. In place of this weight, or in conjunction with it, there may be placed another one 35 mounted on the arm 36 extending from the arm 18.

United to the back part of the frame 11 by means of the hinges 37 and 38 is the rudder or tail 39 of the apparatus.

The rudder is maintained in a straight position by means of the weight 40 secured to the chain 41 which passes around the roller 42 mounted in the support 43. The rudder is formed by a rectangular frame 44 in the upper part of which is mounted a blade or vane 45. By means of the chain 46 that passes around the rollers 47 and 48 and the end of which is secured to the projection 49 of the rudder the latter can be closed in case it is not necessary to use the apparatus.

In the case of an excess wind an automatic device closes the rudder. This device consists in the following:

A sail 50 that can turn on the shaft 51 mounted on the projection 49 is connected by means of the chain 52 to the arm 53 fixed to the hinge 37.

As a variant of the described type, retaining the same principal features, we have the case of Fig. 3.

Three wind driven wheels 1a, 1b and 1c each operate a rim gear and pinion 3. The three lever arms 8a, 8b and 8c operate a common rod 9a attached to the angle arm 10 by the intermediate arm 55.

Operation

When the circumference D (working diagram of Fig. 1a) starts a rotating movement around the centre 7 to which is fixed the straight arm 8 and 18 this movement will be prevented by the arm 8, the rod 9 and the arm 18 and will transform itself into an angular movement, the shaft 7 being transferred along the arcuate path to the point O'.

When this transfer is carried out the straight line 7—23 supported on the shaft 17 is taken to the position O'A' and by its connection with the frame member 15, upon taking the said position O'A' and the pin H takes the position H'. If we continue this rotation a moment will arrive in which the rod 9 will commence to displace itself in the direction of its arrow and the movement of the arm 18 will become inverted, the movement of the arm 21 being consequently inverted, which will start an ascending movement.

Based on this converting device the apparatus in accordance with the present invention functions in the following manner:

Acting as the circumference D we have the rim 6 the rotating movement of which is obtained from the pinion 5 put in motion by the action of the wind on the wheel 1. In the manner already described in the working diagram this movement is transformed by means of the lever arm 8 and the rod 9 into an ascending movement of the arm 21 which lifts by means of the bracket 26 the rod 28. Logically, in continuing the rotation of the rim 6, the arm 21 as we have seen will descend and, therefore, the rod 28 will also descend, thereby producing a rising and falling movement of the rod 28 as the wheel 1 turns under the action of the wind. As will be understood, this reciprocating movement of the rod 28 may be utilized in different forms.

By means of the counterweight both portions of the arm 18 are balanced, all that is necessary then on the part of the wind being the effort intended to cause the wheel 1 to rotate.

If a high wind prevails, this presses on the sail 50 overcoming the resistance offered by the weight 40 and this sail in rotating on its shaft 51 tensions the chain 52 and the rudder turns, closing it.

In the modification shown in Fig. 3, the working diagram (Fig. 3b) is similar to the first case. Here three wheels D effect the rotating movement that is transformed by means of the lever arms 8a, 8b and 8c and the rod 9a into an angular ascending movement of 17—23, with the advantage that the work of the three wheels is concentrated on the arm 21.

What I claim is:

1. A windmill comprising a movable frame, a lever pivoted on the frame for vertical swinging movement on the frame, at least one casing, a wind wheel 1 having a shaft extending in the casing, a gear in the casing having a shaft connected to one end of said lever and in geared connection with the wind wheel shaft and a linkage fixed to the gear shaft and to the frame so that the wind wheel and casing will reciprocate vertically when the wind wheel is rotated, and means connected to said lever for utilizing said vertical reciprocal movement.

2. A windmill comprising a movable frame, a lever having a plurality of branches pivoted for vertical swinging movement on the frame, a plurality of casings, a wind driven shaft extending in each casing, a gear rotatably mounted in each casing and rotatable with respect to the ends of the branches of the lever and in geared connection with the corresponding wind driven shaft and a linkage fixed to each gear and to the frame so that the wind driven shafts and casings will reciprocate vertically when the wind driven shafts are rotated, and means connected to said lever for utilizing said vertical reciprocal movement.

MIGUEL MASSONI.